(12) United States Patent
Citta et al.

(10) Patent No.: US 6,559,898 B1
(45) Date of Patent: May 6, 2003

(54) LOW COST VBS ENCODER AND RF MODULATOR FOR SUPPLYING VSB BASEBAND SIGNAL TO RF INPUT OF DIGITAL TELEVISION RECEIVER

(75) Inventors: Richard W. Citta, Oak Park, IL (US); Raymond C. Hauge, Fox River Grove, IL (US); Thomas P. Horwitz, Elgin, IL (US); Paul A. Snopko, Chicago, IL (US)

(73) Assignee: Zenith Electronics Corporation, Lincolnshire, IL (US)

( * ) Notice: Subject to any disclaimer, the term of this patent is extended or adjusted under 35 U.S.C. 154(b) by 0 days.

(21) Appl. No.: 09/300,299

(22) Filed: Apr. 27, 1999

Related U.S. Application Data

(63) Continuation-in-part of application No. 09/020,274, filed on Feb. 6, 1998.

(51) Int. Cl.[7] ............................................... H04N 5/386
(52) U.S. Cl. ..................... 348/723; 348/724; 348/725; 348/608; 348/21
(58) Field of Search ................................ 348/607, 608, 348/21, 725, 723, 724, 726, 469, 470, 426.1, 425.2; 375/296, 300, 301, 302, 320, 321, 346, 348, 349, 350; 332/170, 149

(56) References Cited

U.S. PATENT DOCUMENTS

| | | |
|---|---|---|
| 4,788,590 A | 11/1988 | Arai |
| 4,958,230 A | 9/1990 | Joaalgadda et al. |
| 5,029,003 A | 7/1991 | Jonnalagadda |
| 5,040,063 A | 8/1991 | Citta et al. |
| 5,086,340 A | 2/1992 | Citta et al. |
| 5,087,975 A | 2/1992 | Citta et al. |
| 5,270,816 A | 12/1993 | Citta et al. |
| 5,283,653 A | 2/1994 | Citta |
| 5,450,392 A | 9/1995 | Waltrich |
| 5,559,561 A | 9/1996 | Wei |
| 5,572,249 A | 11/1996 | Ghosh |
| 5,574,496 A | 11/1996 | Nielsen et al. |
| 5,602,583 A | 2/1997 | Citta |
| 5,602,595 A | 2/1997 | Citta et al. |
| 5,602,602 A | 2/1997 | Hulyalkar |
| 5,602,868 A * | 2/1997 | Wilson ....................... 329/300 |
| 5,636,251 A | 6/1997 | Citta et al. |
| 5,636,252 A * | 6/1997 | Patel et al. ................. 348/729 |
| 5,648,822 A | 7/1997 | Hulyalkar |
| 5,686,966 A | 11/1997 | De La Cierva, Sr. |
| 5,745,187 A | 4/1998 | Hulyalkar et al. |
| 5,748,226 A | 5/1998 | Limberg |
| 5,821,988 A | 10/1998 | Citta et al. |
| 5,822,020 A | 10/1998 | Bargauan |
| 5,875,005 A | 2/1999 | Bargauan |
| 5,909,253 A | 6/1999 | Jonnalagadda et al. |
| 5,946,047 A | 8/1999 | Levan |
| 5,995,135 A | 11/1999 | Limberg |
| 6,148,037 A * | 11/2000 | Abe ........................... 329/357 |
| 6,185,255 B1 * | 2/2001 | Twitchell et al. ............ 348/723 |
| 6,285,412 B1 * | 9/2001 | Twitchell .................... 333/149 |
| 6,411,342 B1 * | 6/2002 | Tatsuta ..................... 348/388.1 |

OTHER PUBLICATIONS

International Search Report, dated May 25, 1999, Application No. PCT/US99/00130.

* cited by examiner

*Primary Examiner*—John Miller
*Assistant Examiner*—Jean W. Désir

(57) ABSTRACT

An encoder-modulator for coupling a digital baseband television signal to a VSB digital television receiver that includes filters, equalization circuitry, and forward error correction circuitry for correcting signal impairments that are below a given threshold. The encoder-modulator processes the baseband signal for low power transmission on an RF channel with less-than-nominal bandpass characteristics. A coaxial cable or other low noise communication link directly connects the RF signal to the RF input of the television receiver. Any errors or signal impairments in the transmitted signal that are below the predetermined threshold are corrected by the filters and equalization circuitry built into the VSB digital television receiver.

83 Claims, 4 Drawing Sheets

LOW COST VBS ENCODER AND RF MODULATOR FOR SUPPLYING VSB BASEBAND SIGNAL TO RF INPUT OF DIGITAL TELEVISION RECEIVER

RELATED APPLICATIONS

This application is a continuation-in-part of U.S. application Ser. No. 09/020,274 filed Feb. 6, 1998.

BACKGROUND OF THE INVENTION AND PRIOR ART

This invention relates generally to digital VSB (vestigial side band) television receivers and specifically to a simple low cost system for coupling a digital VSB signal from any of a plurality of sources of digital signal (such as an MPEG—Motion Picture Experts Group—digital signal) to a digital VSB television receiver. While the description is directed to a VSB digital format, it should be understood that the invention in its broader aspects is not limited to a particular digital format.

The recently adopted Digital Television Standard specifies a VSB subsystem having a terrestrial broadcast mode (8 VSB) and a high data rate mode (16 VSB). There are other VSB modes available, namely 2 VSB, 4 VSB and 8 VSB (non terrestrial). The 8 VSB terrestrial mode has the data carrying capability of 4 VSB. (The Trellis coding that is added for the terrestrial environment creates the additional modulation levels.) The digital data signal for video is MPEG encoded and for audio is Dolby AC-3 processed and must be subjected to decompression before application to conventional video and audio circuitry. For terrestrial broadcasting, the data signal is: randomized; subjected to Reed-Solomon (R/S) type encoding for error correction; interleaved; Trellis encoded; multiplexed with segment sync and field sync; supplied with a DC pilot; subject to pre-equalization filtering; modulated; and RF upconverted for transmission. The digital television receiver includes a tuner and a VSB demodulator for developing the baseband signal, which is in compressed form. The demodulated signal is applied to an equalizer for equalizing the received signal. The baseband signal is applied to a transport demultiplexer which directs the data to an appropriate MPEG decoder and a Dolby decoder for recovering the video and audio in proper form for application to video and audio processing circuitry. Digital signals from other sources, such as DVD (digital video disk) players, VCR's (video cassette recorders), PC's (personal computers), digital cable boxes, satellite receivers and the like will be supplied to digital television receivers, as is the case for present analog television receivers.

In an analog system, it is well known that coupling the signal from a VCR or other video source to a baseband input of a television receiver (if one is available) yields results superior to those achieved by modulating the signal to RF channel 3 or channel 4 and supplying it to the tuner input of the television receiver. This is not, however, necessarily true in a digital environment in which case the distance between the baseband signal source and the television receiver must be kept relatively short. In an analog system, it is also well known to supply double sideband signals to a receiver.

In accordance with the invention, a compressed baseband digital signal is encoded in a given format for digital transmission and is modulated on an RF carrier for direct application via a cable network or wireless link to the RF input of a digital television receiver. The RF signal, which is at a low power level and has a less-than-nominal bandpass, takes advantage of the front end signal processing that is built into the digital television receiver. Signal impairments, due to the less-than-nominal bandpass characteristic and noise introduced during transmission, that are below a given threshold are corrected by the correction circuitry in the digital television receiver front end. The low signal power, the corrective circuitry for the digital signal and the benign environment of the communications link, enable components and circuits of much lower tolerance (and cost) to be used in the encoding and modulating process. The result is an encoder-modulator that is very low cost and very effective in coupling a digital baseband signal to a digital television receiver over an RF channel.

OBJECTS OF THE INVENTION

A principal object of the invention is to provide a novel digital signal translation system.

Another object of the invention is to provide a digital encoder-modulator for coupling a baseband digital signal to a VSB digital television receiver.

A further object of the invention is to provide a low cost digital signal coupling system for a VSB digital television receiver.

BRIEF DESCRIPTION OF THE DRAWINGS

These and other objects and advantages of the invention will be apparent upon reading the following description in conjunction with the drawing, in which.

DESCRIPTION OF THE PREFERRED EMBODIMENT

Figure 1:
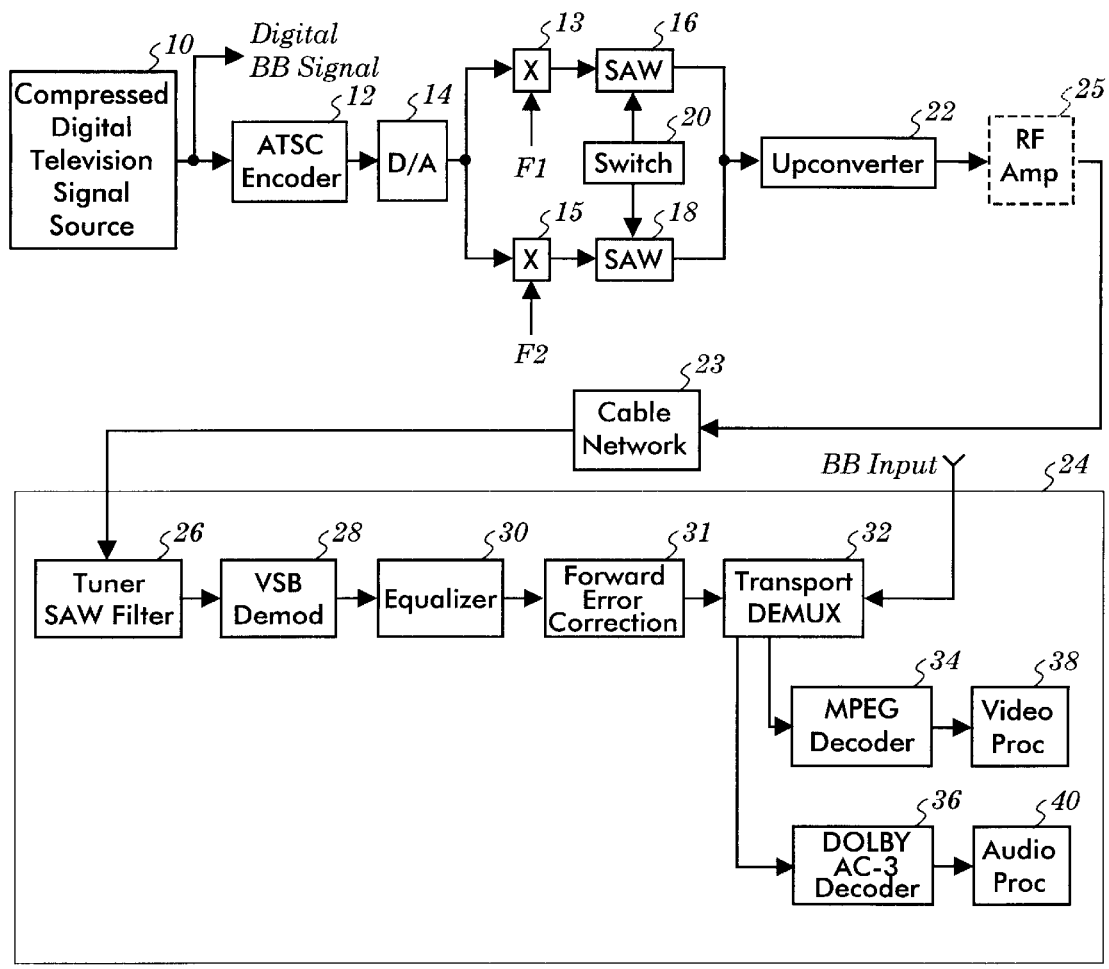
FIG. 1 is a simplified block diagram of a VSB digital signal encoder-modulator constructed in accordance with the invention.

Referring to FIG. 1, a source of digital MPEG encoded signal 10, derived from any of a number of different source types, is shown. For example, the source 10 may comprise a satellite receiver, a VCR, a DVD, a digital cable box, a PC, etc. The output of the source 10 is an MPEG (and Dolby AC-3) encoded digital signal at baseband frequency. This baseband signal may be applied directly to a baseband input of a digital television receiver 24. However, in accordance with the invention, the baseband signal is applied to an ATSC encoder 12 where the signal is subjected to interleaving, randomizing, R/S error encoding, and Trellis encoding. Field and segment syncs are added, and while not indicated, a pilot is inserted and equalization filtering is employed. (See ATSC Standard A/53, ATSC Digital Television Standard for a detailed description of these operations.) The signal is then supplied to a digital to analog (D/A) converter 14. The D/A converter 14 supplies the analog signal to a pair of multipliers 13 and 15 that in turn supply signals to a pair of SAW (surface acoustic wave) filters 16 and 18. The multipliers 13 and 15 are supplied with a frequency F1 and F2, respectively, for producing two different outputs. The SAW filters 16 and 18 are selectively controlled by a switch 20, with one of the SAW filters 16 and 18 being used for one selected channel RF output and the other being used for another selected channel RF output. The particular RF channel selected is dependent upon the environment in which the encoder-modulator is used, in particular the availability and type of RF channels in the receiving area. The SAW filters 16 and 18 are relatively low cost devices and are extensively used in television receivers.

Those skilled in the art will recognize that highly accurate modulators generate I and Q signals with the signals being combined to cancel one of the sidebands and generate a vestigial sideband signal. Such modulators are quite complex and very expensive. In one form of the invention, that arrangement is replaced with a multiplier (13,15) and a SAW filter (16,18). The output of the multiplier is a double sideband suppressed carrier signal. The-following SAW filter removes most of one sideband (preferably, although not necessarily, the lower sideband) to produce a VSB signal and also approximates the nominal Nyquist slope of the channel bandpass. As a result of the less than nominal bandpass characteristic, the transmitted signal will be characterized by a degree of impairment in the form of intersymbol interference (ISI).

The SAW filters 16 and 18 shape the edges of the signal bandpass to approximate the Nyquist slopes, nominally called for at the band edges in the ATSC standard. (The Nyquist slopes may be seen by reference to the solid line curve of FIG. 3.) The SAW filter characteristics also provide for adjacent channel rejection. The filtered signal from the selected one of the SAW filters 16 and 18 is applied to an RF upconverter 22, which upconverts the signal to any desired RF channel, channels 3 or 4 being the ones normally used.

The encoded and modulated VSB signal is supplied over a cable network 23, which may comprise a single coaxial cable or a relatively complex home cable network, to an RF channel input of a tuner 26 of the VSB digital television receiver 24. The signal may also be amplified by a low power RF amplifier 25 (shown in dotted line in FIG. 1) and transmitted wirelessly to the VSB digital television receiver 24 in an assigned RF broadcast television channel. The received signal is supplied through a companion SAW filter to a VSB demodulator 28 where the baseband digital signal is recovered. The demodulated signal is applied to an equalizer 30 that operates to adjust the response of the VSB digital television receiver 24 to very closely match the solid line Nyquist response (FIG. 3) thereby correcting any signal impairments, including any intersymbol interference introduced in the transmitter and any linear distortions introduced in the communications link (i.e., the cable network or wireless link) that collectively are below a given threshold level that is dependent upon the nature of the equalizer. The signal from the equalizer 30 is processed by a forward error correction subsystem 31 to correct any residual errors due to intersymbol interference and errors due to noise, both white and impulse, introduced by the cable network or wireless link. The performance of the equalizer 30 and the forward error correction subsystem 31 sets the limit on the amount of intersymbol interference and linear distortion which can be introduced by the transmitter and the communications channel before the system suffers serious degradation.

The corrected signal (in MPEG encoded form) is supplied to a transport demultiplexer 32 that has separate outputs for the video and audio portions of the signal. The video portion is applied to an MPEG decoder 34 for decompression and decoding, and the audio portion is applied to a Dolby AC-3 decoder 36 for complementary processing. The resultant video and audio signals are applied to a video processor 38 and an audio processor 40, respectively.

It will be appreciated by those skilled in the art that a received RF signal is not as distance sensitive as a a baseband signal, and the coaxial cable environment further minimizes errors or impairments being introduced in transmission. However, even if some signal impairments are introduced, they may be compensated for by the corrective circuitry built into the VSB digital television receiver 24, in particular the equalization circuitry. The result is a signal translation arrangement that results in excellent transfer of signal from the source 10 to the VSB digital television receiver 24, since the signal is VSB encoded and any errors or signal impairments below a given threshold are correctable in the VSB digital television receiver 24.

In contrast, any baseband digital signals that are supplied to the VSB digital television receiver 24 are introduced after the equalizer 30 and the error correction subsystem 31 and are consequently not subject to the corrective effects of the circuitry in the VSB digital television receiver 24. Such signals are also distance limited and subject to uncorrectable errors or impairments, which makes the method of the invention far superior.

In further accordance with the invention, where the VSB digital television receiver 24 has provision for receiving both a digital and an analog NTSC signal, in establishing priority of the RF channel output of the upconverter 22, the first choice is to supply the signal on a vacant RF channel in the service area of the television receiver, and the second choice is to supply it on the digital one of a pair of digital and analog NTSC RF channels in the service area of the VSB digital television receiver 24. In this way, any NTSC interference into the digital channel can be minimized by the circuitry in the digital channel of the VSB digital television receiver 24.

The invention resides in the concept of introducing a given level of impairments in the encoded digital baseband signal and taking advantage of the signal correction circuitry that is built into the front end of the VSB digital television receiver 24 to compensate for such impairments. The cost is kept minimal since, in the application of the invention, transmission power is very low, distance is limited, the coaxial cable is a low noise environment, and the channel shape (Nyquist slope) need not be as rigorously defined for adjacent channel rejection, signal radiation, etc. This translates into low cost filtering to create a less-than-nominal Nyquist slope. While this will clearly cause some intersymbol interference, as mentioned above, all such signal impairments that are below a predetermined threshold may be compensated for in the VSB digital television receiver 24 by the cooperative action of complementary filtering, the equalization circuitry, and the forward error correction circuitry.

Figure 2:
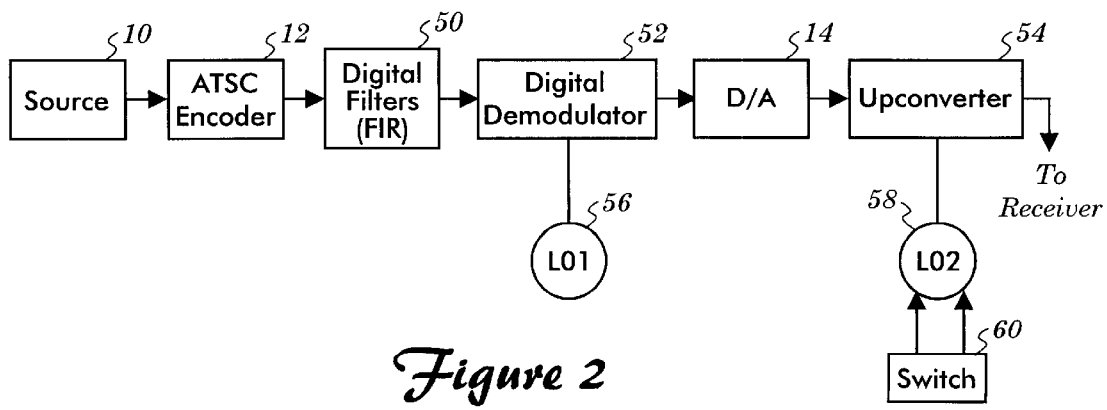
FIG. 2 is a simplified block diagram of another form of a digital signal encoder-modulator constructed in accordance with the invention.

The encoder-modulator of FIG. 2 is a different version of the invention. Here, the low cost SAW filters 16 and 18 of FIG. 1 have been replaced by digital filters 50, indicated as being FIR (finite impulse response) filters. A digital modulator 52 is supplied with the output of a first local oscillator 56 and converts the filtered input signal to a first IF signal having a frequency, for example, of about 12 MHZ. This signal is applied to a D/A converter 14 and thence to an RF upconverter 54 that is supplied with the output of a second local oscillator 58. The second local oscillator 58 is controlled by a switch 60 to develop an RF output from the upconverter 54 at either of a pair of RF channel frequencies, as in the tuner of FIG. 1. The output signal is transmitted to the VSB digital television receiver 24 over the coaxial cable 23. This version of the invention appears to be a more stable system. Since both systems will involve integrated circuitry, it remains to be seen whether the cost of the SAW filters 16 and 18 in the FIG. 1 version will be less than the cost of the additional chip area required in the integrated circuit implementation of the FIG. 2 version.

Figure 3:
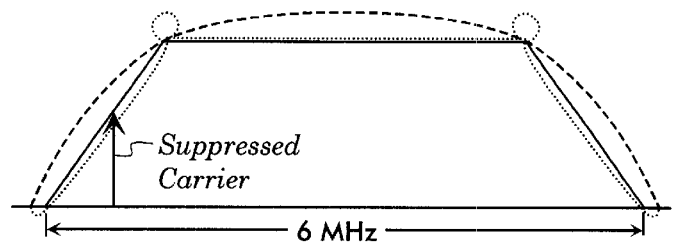
FIG. 3 are curves illustrating the bandpass characteristics of the encoder modulator of the invention.

In FIG. 3, the solid line curve indicates the ideal Nyquist slope channel bandpass response characteristic of the transmitted signal. The dashed line curve indicates the less-than-nominal Nyquist slope that results from using the low cost SAW filters 16 and 18 in FIG. 1 and the dotted line curve represents the response for the FIG. 2 implementation using the FIR filters 50. The curves should be recognized as being representative only and their actual shapes are dependent upon the precision and the number of the filtering elements used. As mentioned, because of the less-than-nominal bandpass characteristic produced by either the SAW or the FIR filter embodiment of the invention, a certain level of intersymbol interference will be introduced into the transmitted signal. However, as discussed above, the amount of any such intersymbol interference, together with any noise introduced into the signal over the communications link, can be substantially corrected in the VSB digital television receiver 24 to provide near perfect signal translation and reception. In this manner, the invention permits a low cost, high performance encoder-remodulator by deliberately selecting lesser tolerance components and applying the signal to a digital receiver that has the capability of compensating for signal impairments below a given threshold.

Figure 4:
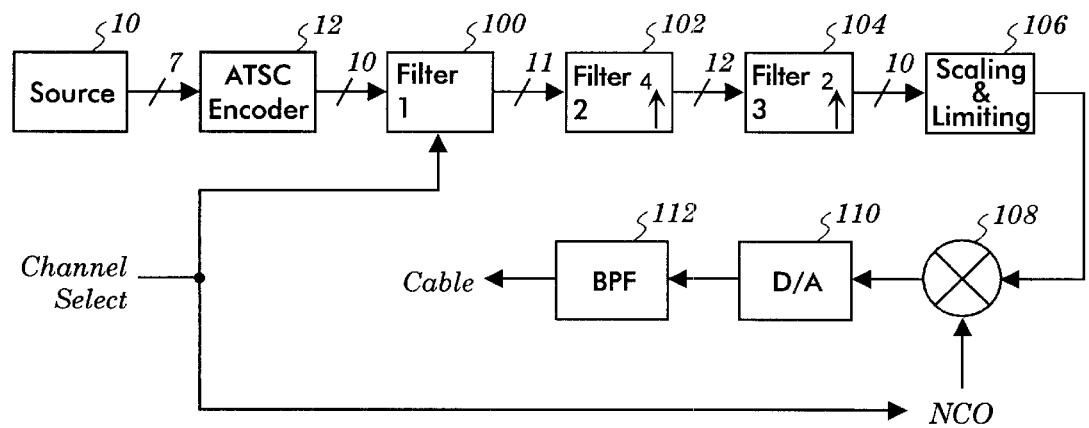
FIG. 4 is a simplified block diagram of still another form of a digital signal encoder-modulator constructed in accordance with the invention.
Figure 5A:
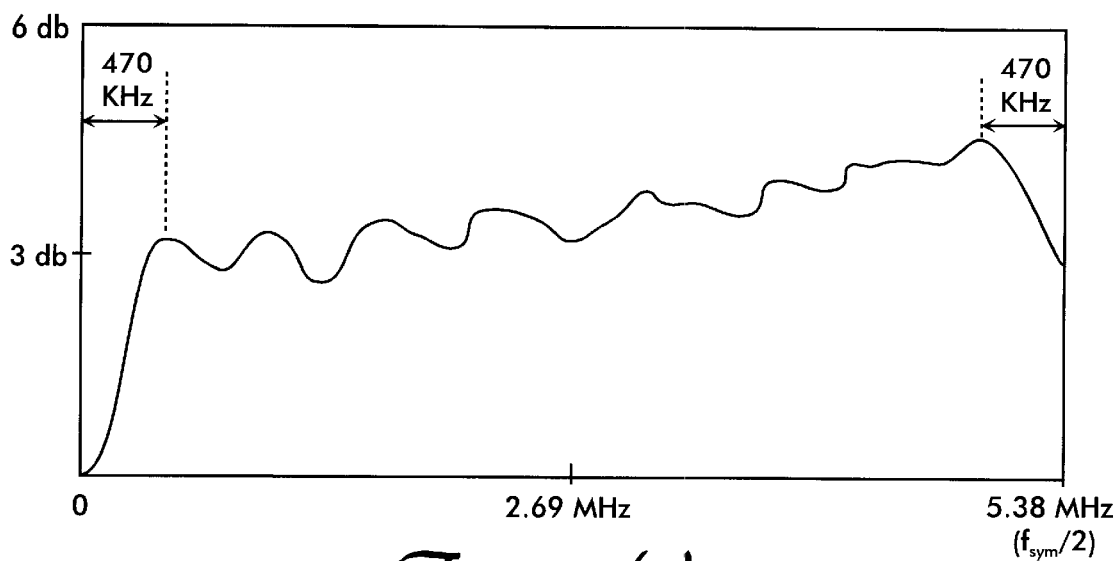
FIG. 5a illustrates the frequency response of the Filter 1 of FIG. 4 for channel 3.
Figure 5B:
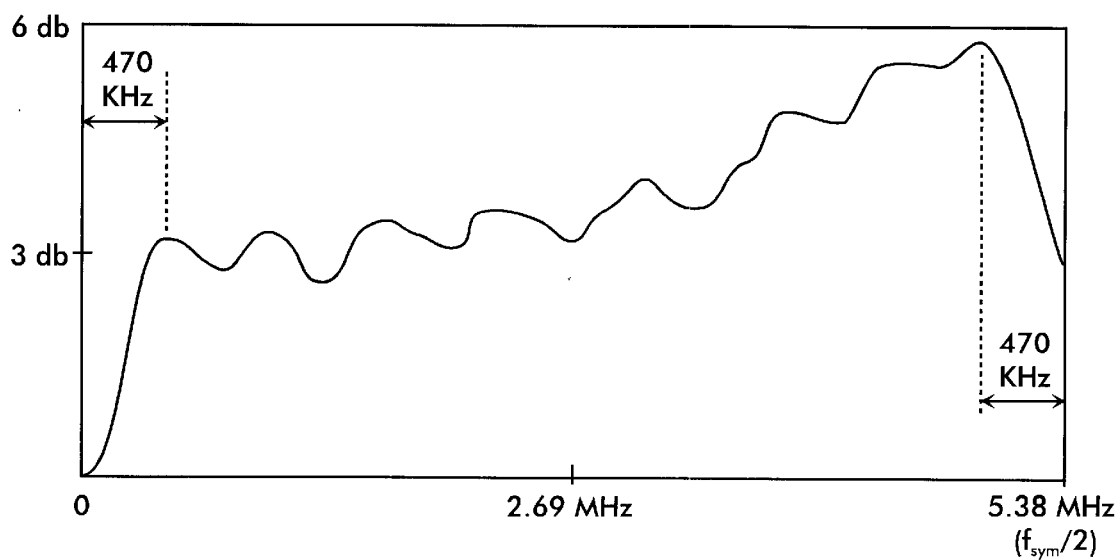
FIG. 5b illustrates the frequency response of the Filter 1 of FIG. 4 for channel 4.

The encoder-modulator of FIG. 4 is another embodiment of the invention and includes the source 10, the ATSC encoder 12, a digital filter 100, a digital filter 102, a digital filter 104, a scaler and limiter 106, a mixer 108, a D/A converter 110, and a channel bandpass filter 112. FIGS. 5a and 5b show square root raised cosine responses of the digital filter 100 starting at the band edges with a transition region of 470 KHZ from the band edges to full magnitude. The tilt in the frequency responses of the digital filter 100 is caused by the sinx/x correction. In FIG. 5, the frequency $f_{sym}$ is the symbol clock frequency (10.76 MHZ) of the ATSC encoder 12, which is typically used in digital televisions. The frequency response of the digital filter 100 for channel 3 is shown in FIG. 5a, and the frequency response of the digital filter 100 for channel 4 is shown in FIG. 5b.

The digital filter 100 is a thirty-three tap FIR (finite impulse response) filter that provides band shaping and sinx/x correction. A representative set of tap values for the digital filter 100 is shown in the Table 1 below. The band shaping reduces intersymbol interference in the VSB digital television receiver 24. The sinx/x correction compensates for the sinx/x rolloff created by the D/A converter 110.

TABLE 1

| Tap | Value | Tap | Value | Tap | Value |
|---|---|---|---|---|---|
| 1 | −2 | 12 | 0 | 23 | −4 |
| 2 | 0 | 13 | −4 | 24 | 0 |
| 3 | −2 | 14 | 0 | 25 | −4 |
| 4 | 0 | 15 | −4 | 26 | 0 |
| 5 | −2 | 16 | −9/−12 | 27 | −2 |
| 6 | 0 | 17 | 180 | 28 | 0 |
| 7 | −2 | 18 | −9/−12 | 29 | −2 |
| 8 | 0 | 19 | −4 | 30 | 0 |
| 9 | −4 | 20 | 0 | 31 | −2 |
| 10 | 0 | 21 | −4 | 32 | 0 |
| 11 | −4 | 22 | 0 | 33 | −2 |

The tap value of −9 for taps 16 and 18 is selected for channel 3 and the tap value of −12 is selected for channel 4.

Figure 6:
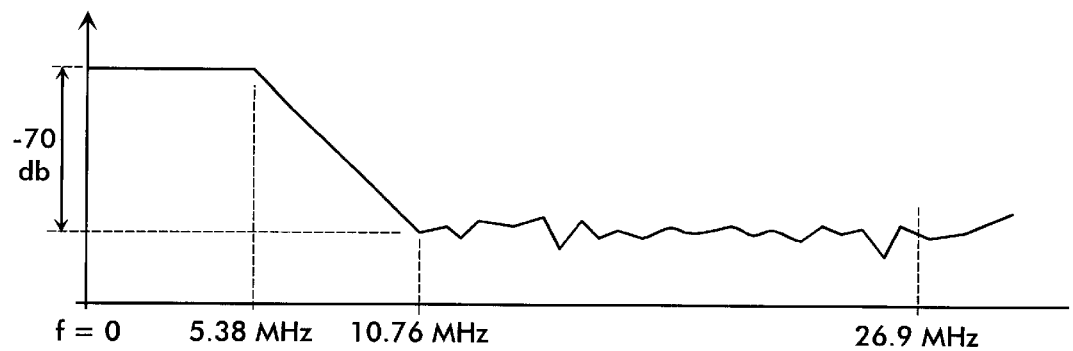
FIG. 6 illustrates the frequency response of the Filter 2 of FIG. 4.

The digital filter 102 interpolates the baseband data from the digital filter 100 by four. The output of this interpolation includes the baseband data and three images, and the digital filter 102 is further arranged to remove the three images. The interpolation imposed by the filter 102 effectively increases the clock rate from $f_{sym}$ to $4f_{sym}$. the digital filter 102 may be a twenty tap low pass FIR filter having the frequency response shown in FIG. 6. This response is substantially flat from about f=0 to 5.38 MHZ and has a stop band which begins at about 10.76 MHZ. A representative set of tap values is shown in the Table 2 below.

TABLE 2

| Tap | Value | Tap | Value |
|---|---|---|---|
| 1 | −2 | 11 | 128 |
| 2 | −2 | 12 | 73 |
| 3 | 3 | 13 | 8 |
| 4 | 9 | 14 | −23 |
| 5 | 3 | 15 | −15 |
| 6 | −15 | 16 | 3 |
| 7 | −23 | 17 | 9 |
| 8 | 8 | 18 | 3 |
| 9 | 73 | 19 | −2 |
| 10 | 128 | 20 | −2 |

Figure 7:
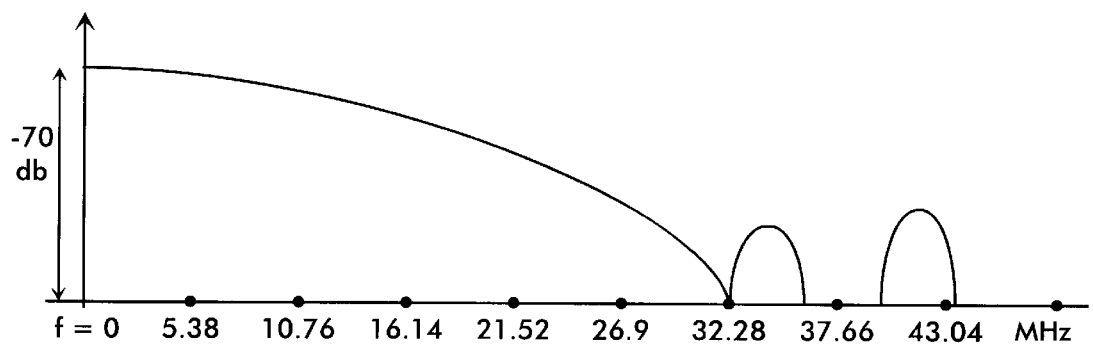
FIG. 7 illustrates the frequency response of the Filter 3 of FIG. 4.

The digital filter 104 is a ten tap lowpass FIR filter that interpolates the baseband data from the filter 102 by two and then removes the image of the baseband data caused by the interpolation by two. The interpolation imposed by the filter 104 effectively increases the clock rate from $4f_{sym}$ to $8f_{sym}$. At this point, the clock rate is now 86.08 MHZ. The frequency response-of the digital filter 104 is shown in FIG. 7. This frequency response is substantially flat from about f=0 to 5.38 MHZ, and has a stop band starting at about 32.28 MHZ. A representative set of tap values is shown in the Table 3 below.

TABLE 3

| Tap | Value | Tap | Value |
|---|---|---|---|
| 1 | −1 | 6 | 64 |
| 2 | −5 | 7 | 28 |
| 3 | −1 | 8 | −1 |
| 4 | 28 | 9 | −5 |
| 5 | 64 | 10 | −1 |

The scaler and limiter 106 scales the baseband data from the digital filter 104 by a multiplier (such as 0.65625) and reduces the average signal power of the baseband data by a predetermined amount (such as 3.7 db). The signal is also limited by the scaler and limiter 106 to ten bits. The mixer 108 receives a numerically controlled oscillator frequency which modulates the baseband data onto a selected RF carrier frequency. For example, the numerically controlled oscillator frequency may cause the mixer 108 to modulate the baseband data onto the frequency of a selected one of channel 3 or 4.

Specifically, the mixer 108 receives the data which is clocked at 86.08 MHZ ($8f_{sym}$ as discussed above). The oscillator (NCO) frequency for channel 3 or 4 is approximately the clock frequency (86.08 MHZ) minus the pilot frequency for the respective channel (about 310 KHZ above the lower edge of the channel). Therefore, the oscillator (NCO) frequency for channel 3 is 86.08 MHZ−(60.0 MHZ+0.31 MHZ)=25.77 MHZ, and the oscillator (NCO) frequency for channel 4 is 86.08 MHZ−(66.0 MHZ+0.31 MHZ)=19.77 MHZ.

The oscillator (NCO) frequency is chosen so that the first image above the Nyquist frequency of the modulated data falls in either channel 3 or channel 4. The sinx/x compensation of the digital filter 100 is also designed to correct this image. The signal to noise ratio of the first image is good enough to be received also by an ATSC receiver. Therefore, the first image will be used as the modulated output, and the fundamental output of the D/A converter 110 will be ignored.

Figure 8:
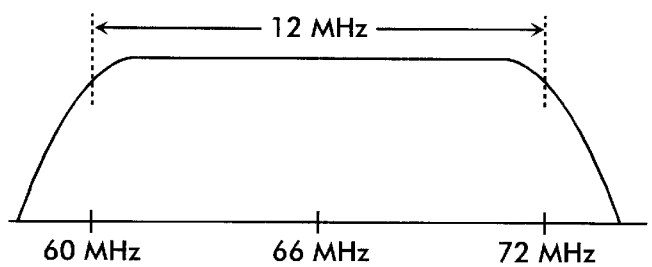
FIG. 8 illustrates the frequency response of the bandpass filter of FIG. 4.

The modulated data is converted to analog modulated data by the D/A converter 110. The signal at this point is a double sideband signal occupying a bandwidth of about $2f_{sym}$ or 21.52 MHZ and, thus, includes the selected band as well as a lower sideband. The channel bandpass filter 112 has a one db bandwidth of about 12 MHZ and is centered at 66 MHZ. Accordingly, the passband for the channel bandpass filter 112 is 60–72 MHZ. As explained above, the frequency of the oscillator (NCO) is selected so that the first image of the modulated data at the output of the D/A converter 110 above the fundamental frequencies of the modulated data fall within this passband for channels 3 and 4. FIG. 8 illustrates the frequency response of the channel bandpass filter 112 of FIG. 4. The channel bandpass filter 112 removes the fundamental data and those images of the fundamental data that are higher than the first image. The first image, accordingly, provides data in channels 3 and 4. The VSB digital television receiver 24 tunes to the desired one of channel 3 or 4 and removes the out-of-band signals including the lower sideband of the selected channel. That is, the channel bandpass filter 112 passes the first image of the channel 3 or 4 frequencies.

Thus, the arrangement shown in FIG. 4 provides a double sideband modulated signal at the output of the modulator 108. This double sideband modulator reduces the complexity of a re-modulator at the cost of increased bandwidth. However, any errors introduced by this modulator are well within the error correction capability of the VSB digital television receiver 24.

The present invention permits the use of low cost re-modulation in such appliances as VCRs. The modulator of the present invention introduces more distortions and/or noise into the signal than does a modulator used at a transmitter. However, in applications where the signal path between the modulator of the present invention and the digital receiver is short and is typically provided by a coax cable (as compared to long, over the air signal paths between broadcast transmitters and receivers), few errors are introduced into the signal by the signal path so that the increased number of error introduced by the modulator of the present invention is still below the limit error correction threshold of the error correction circuits of digital receivers.

Certain modifications and alternatives of the present invention have been discussed above. Other modifications and alternatives will occur to those practicing in the art of the present invention. For example, the digital filters 100, 102, and 104 have been described above as FIR filters having a specified set of tap values. However, filters other than FIR filters may be used. Also, FIR filters having a different number of taps and/or other tap values may be used.

Also, the embodiment shown in FIG. 1 uses two multipliers (i.e., the multipliers 13 and 15) and two SAW filters (i.e., the SAW filters 16 and 18) with an upconverter 22. Alternatively, a single multiplier and a single SAW filter may instead be used, where the upconverter 22 is switched for either channel 3 or channel 4. As a further alternative, two multipliers and two SAW filters may be used as shown. However, the upconverter 22 may be eliminated, and the frequencies F1 and F2 may be selected in order to produce data on channel 3 or channel 4.

Accordingly, what has been described is a novel method and apparatus for translating a digital television signal from a digital source to a VSB digital television receiver. It is recognized that numerous changes to the described embodiment of the invention will be apparent to those skilled in the art without departing from its true spirit and scope. The invention is to be limited only as defined in the claims.

What is claimed is:

1. A method of operating a digital signal system for supplying a digital television receiver having correction circuitry capable of correcting impairments in a received signal that are below a predetermined threshold comprising:

developing a compressed baseband digital signal;

encoding the compressed baseband digital signal in a given format for digital transmission; and, modulating the encoded compressed baseband digital signal on an RF carrier at a relatively low power level for application over a limited distance to an RF input of the digital television receiver;

the modulating step resulting in a less-than-nominal bandpass which produces impairments in the transmitted signal that are less than the predetermined threshold;

whereby the correction circuitry is capable of correcting the impairments introduced in the modulating step.

2. The method of claim 1 wherein the encoding step includes data interleaving, data randomizing, error correction and addition of VSB field and segment syncs, and further comprising:

performing the modulating step at a low power level.

3. The method of claim 1 further comprising:

supplying the encoded compressed baseband digital signal through a first filter having a response designed to cooperate with a second filter in the digital television receiver for producing a less-than-nominal Nyquist slope.

4. The method of claim 1 further comprising:

supplying the encoded compressed baseband digital signal through a first filter having a response designed to cooperate with equalization circuitry and a second filter of the digital television receiver in order to generate a nominal Nyquist slope and to provide adjacent channel rejection at each end of the signal bandpass.

5. The method of claim 1 wherein the television receiver comprises a digital signal processing system and an analog NTSC signal processing system, the method further comprising generating the modulated RF digital signal for application to the digital processing system of the television receiver.

6. The method of claim 1 wherein the RF carrier is applied to the RF input of the digital television receiver by a coaxial cable network.

7. The method of claim 1 wherein the modulating step comprises:
multiplying the encoded compressed baseband digital signal by a predetermined carrier frequency to generate a double sideband suppressed carrier signal; and,
filtering the double sideband suppressed carrier signal to remove one of the sidebands in order to develop a VSB signal and to provide the less-than-nominal bandpass.

8. The method of claim 7 wherein the filtering step uses a SAW, and wherein the less-than-nominal bandpass has a less-than-nominal Nyquist slope.

9. The method of claim 1 wherein the correction circuitry comprises equalization and forward error correction circuitry.

10. The method of claim 1 wherein the RF carrier is applied wirelessly to the RF input of the digital television receiver over a broadcast television channel.

11. A system for supplying a compressed digital baseband signal to a digital television receiver that includes correction circuitry capable of correcting impairments in a received signal that are below a predetermined threshold, comprising:
a source of compressed baseband signal;
an encoder that encodes the baseband signal in a given digital format;
a modulator that modulates the encoded baseband signal on an RF carrier at a relatively low power level for application over a limited distance to an RF input of the digital television receiver;
the modulator having a less-than-nominal bandpass that produces impairments in the modulated encoded baseband signal which are below the predetermined threshold; and
a limited distance communication link for directly applying the modulated encoded signal to an RF input of the digital television receiver, whereby the correction circuitry is capable of correcting the impairments introduced by the modulator.

12. The system of claim 11 wherein the encoder and the digital television receiver each include a filter, and wherein the filters cooperate to generate a less-than-nominal Nyquist slope.

13. The system of claim 12 wherein the filters and equalization circuitry of the digital television receiver cooperate to generate a nominal Nyquist slope and provide adjacent channel rejection at each end of the signal bandpass.

14. The system of claim 11 wherein the given digital format is VSB, wherein the compressed digital signal is in MPEG form, wherein the encoder includes a data randomizer, a data interleavor, error correction circuitry, and means for adding VSB frame and field syncs, and wherein the modulator operates at low power.

15. The system of claim 11 wherein the RF carrier is applied to the RF input of the digital television receiver by a coaxial cable network.

16. The system of claim 11 wherein the digital television receiver comprises a digital signal processing system and an analog NTSC signal processing system, and wherein the modulated RF digital signal is generated for application to the digital processing system of the television receiver.

17. The system of claim 11, further comprising:
developing means in the modulator for developing a double sideband suppressed carrier signal from the baseband signal; and,
removing means coupled to the multiplying means for substantially removing one of the sidebands to develop a VSB signal and for producing the less-than-nominal bandpass.

18. The system of claim 17 wherein the removing means comprises a SAW filter, and wherein the less-than-nominal bandpass includes a less-than-nominal Nyquist slope.

19. The system of claim 11 wherein the correction circuitry comprises equalization and forward error correction circuitry.

20. The system of claim 11 wherein the RF carrier is applied wirelessly to the RF input of the digital television receiver over a broadcast television channel.

21. A method of supplying a signal to a digital television receiver having correction circuitry capable of correcting errors in a received signal that are below a predetermined threshold comprising the following steps:
encoding a baseband digital signal in a given format for digital transmission; and,
modulating the encoded baseband digital signal on an RF carrier at a relatively low power level so as produce a double sideband RF signal for application over a limited distance to an RF input of the digital television receiver, wherein the modulating step produces errors in the transmitted signal that are greater in number than are typically produced by a broadcast transmitter but that are less in number than the predetermined threshold.

22. The method of claim 21 wherein the encoding step includes data interleaving, data randomizing, error correction, and adding of VSB field and segment syncs.

23. The method of claim 21 wherein the modulating step comprises the step of filtering the encoded baseband digital signal for band shaping and sinx/x correction.

24. The method of claim 23 wherein the filtering step comprises the step of filtering with a passband filter having a passband substantially equal to a frequency of a symbol clock $f_{sym}/2$.

25. The method of claim 23 wherein the filtering step comprises the step of filtering with a passband 33 tap FIR filter having substantially the following tap values:
–2; 0; –2; 0; –2; 0; –2; 0; –4; 0; –4; 0; –4; 0; –4; –9/–12; 180; –9/–12; –4; 0; –4; 0; –4; 0; –4; 0; –2; 0; –2; 0; –2; 0; –2.

26. The method of claim 24 wherein the filtering step is a first filtering step, and wherein the modulating step comprises a second filtering step of filtering the band shaped and sinx/x corrected encoded baseband digital signal for interpolation and image removal.

27. The method of claim 26 wherein the interpolation is by four.

28. The method of claim 26 wherein the second filtering step comprises the step of filtering with a low-pass filter having a substantially flat response in the range of about f=0 to $f_{sym}/2$ and having a stop band which begins at about $f_{sym}$.

29. The method of claim 26 wherein the second filtering step comprises the step of filtering with a pass-band 20 tap FIR filter having substantially the following tap values: –2; –2; 3; 9; 3; –15; –23; 8; 73; 128; 128; 73; 8; –23; –15; 3; 9; 3; –2; –2.

30. The method of claim 26 wherein the modulating step comprises a third filtering step of filtering the band shaped, sinx/x corrected, interpolated, and image removed encoded baseband digital signal for interpolation and image removal.

31. The method of claim 30 wherein the interpolation of the third filtering step is by two.

32. The method of claim 30 wherein the third filtering step comprises the step of filtering with a low-pass filter having 33. The method of claim 30 wherein the third filtering step comprises the step of filtering with a pass-band 10 tap FIR filter having substantially the following tap values: −1; −5; −1; 28; 64; 64; 28; −1; −5; −1.

34. The method of claim 30 wherein the modulating step comprises the step of bandpass filtering the modulated RF signal so as to remove unwanted images of the modulated data.

35. The method of claim 34 wherein the bandpass filtering step comprises the step of bandpass filtering with a passband of about 12 MHZ for channel 3 and channel 4.

36. The method of claim 34 wherein the bandpass filtering step comprises the step of bandpass filtering with a passband centered at about 66 MHZ.

37. The method of claim 36 wherein the bandpass filtering step comprises the step of bandpass filtering with a passband of about 12 MHZ for channel 3 and channel 4.

38. The method of claim 21 wherein the modulating step comprises the step of bandpass filtering the modulated RF signal so as to remove unwanted images of the modulated data.

39. The method of claim 38 wherein the bandpass filtering step comprises the step of bandpass filtering with a passband of about 12 MHZ for channel 3 and channel 4.

40. The method of claim 38 wherein the bandpass filtering step comprises the step of bandpass filtering with a passband centered about 66 MHZ.

41. The method of claim 40 wherein the bandpass filtering step comprises the step of bandpass filtering the modulated RF signal with a passband of about 12 MHZ for channel 3 and channel 4.

42. The method of claim 38 wherein the step of bandpass filtering the modulated RF signal comprises the step of bandpass filtering the modulated RF signal with a passband that passes images of the channel 3 and 4 modulated data.

43. The method of claim 21 wherein the modulating step comprises the step of filtering the encoded baseband digital signal for interpolation and image removal.

44. The method of claim 21 wherein the modulating step comprises the steps of interpolating the encoded baseband digital signal and of mixing the interpolated and encoded baseband digital signal with a signal selected to produce an RF signal.

45. The method of claim 21 wherein the RF carrier is applied to the RF input of the digital television receiver by a coaxial cable network.

46. The method of claim 21 wherein the modulating step comprises the step of filtering the encoded baseband digital signal with a passband filter having a passband substantially equal to a frequency of a symbol clock $f_{sym}/2$.

47. The method of claim 46 wherein the filtering step is a first filtering step, and wherein the modulating step comprises a second step of filtering a result of the first filtering step with a lowpass filter having a substantially flat response in the range of about f=0 to $f_{sym}/2$ and having a stop band which begins at about $f_{sym}$.

48. The method of claim 47 wherein the second filtering step comprises the step of interpolating the result of the first filtering step by four.

49. The method of claim 48 wherein the modulating step comprises a third step of filtering a result of the second filtering step with a lowpass filter having a substantially flat response in the range of about f=0 to $f_{sym}/2$ and having a stop band which begins at about $3f_{sym}$.

50. The method of claim 49 wherein the third filtering step comprises the step of interpolating the result of the second filtering step by two.

51. The method of claim 21 wherein the modulating step comprises the step of filtering the encoded baseband digital signal with a lowpass filter having a substantially flat response in the range of about f=0 to $f_{sym}/2$ and having a stop band which begins at about $f_{sym}$.

52. The method of claim 51 wherein the filtering step comprises the step of interpolating the encoded baseband digital signal by four.

53. The method of claim 51 wherein the filtering step is a first filtering step, and wherein the modulating step comprises a second step of filtering a result of the first filtering step with a lowpass filter having a substantially flat response in the range of about f=0 to $f_{sym}/2$ and having a stop band which begins at about $3f_{sym}$.

54. The method of claim 53 wherein the second filtering step comprises the step of interpolating the result of the first filtering step by two.

55. The method of claim 21 wherein the modulating step comprises the step of filtering the encoded baseband digital signal with a lowpass filter having a substantially flat response in the range of about f=0 to $f_{sym}/2$ and having a stop band which begins at about $3f_{sym}$.

56. The method of claim 55 wherein the filtering step comprises the step of interpolating the encoded baseband digital signal by two.

57. A modulation system for modulating a television baseband signal to an RF signal for direct supply to an RF input of a digital television comprising:

an encoder that encodes a baseband digital signal in a standard channel coded format;

a modulator that modulates the encoded baseband digital signal on an RF carrier at a low power level so as produce a double sideband RF signal having a fundamental component and multiple images thereof for application over a limited distance to an RF input of the digital television receiver; and, a filter having a passband for passing substantially only the first image of the modulated signal.

58. The modulation system of claim 57 wherein the filter is a first filter, wherein the modulator comprises a second filter that is arranged to filter the encoded compressed baseband digital signal for band shaping and sinx/x correction.

59. The modulation system of claim 58 wherein the second filter is a passband filter having a passband substantially equal to a frequency of a symbol clock $f_{sym}/2$.

60. The modulation system of claim 59 wherein the second filter is a passband 33 tap FIR filter having substantially the following tap values:

−2; 0; −2; 0; −2; 0; −2; 0; −4; 0; −4; 0; −4; 0; −4; −9/−12; 180; −9/−12; −4; 0; −4; 0; −4; 0; −4; 0; −2; 0; −2; 0; −2; 0; −2.

61. The modulation system of claim 58 wherein the modulator comprises a third filter that is arranged to filter the encoded baseband digital signal for interpolation and image removal.

62. The modulation system of claim 61 wherein the third filter is a lowpass filter having a substantially flat response in the range of about f=0 to $f_{sym}/2$ and having a stop band which begins at about $f_{sym}$.

63. The modulation system of claim 61 wherein the third filter is a passband 20 tap FIR filter having substantially the following tap values:

−2; −2; 3; 9; 3; −15; −23; 8; 73; 128; 128; 73; 8; −23; −15; 3; 9; 3; −2; −2.

64. The modulation system of claim 61 wherein the interpolation is by four.

65. The modulation system of claim 61 wherein the modulator comprises a fourth filter that is arranged to filter the interpolated and encoded baseband digital signal for further interpolation and image removal.

66. The modulation system of claim 65 wherein the fourth filter is a lowpass filter having a substantially flat response in the range of about f=0 to $f_{sym}/2$ and having a stop band which begins at about $3f_{sym}$.

67. The modulation system of claim 65 wherein the fourth filter is a passband 10 tap FIR filter having substantially the following tap values:

−1; −5; −1; 28; 64; 64; 28; −1; −5; −1.

68. The modulation system of claim 65 wherein the interpolation is by two.

69. The modulation system of claim 57 wherein the filter has a passband of about 12 MHZ for channel 3 and channel 4.

70. The modulation system of claim 57 wherein the modulator comprises a passband filter having a passband substantially equal to a frequency of a symbol clock $f_{sym}/2$, and wherein $f_{sym}$ is a symbol clock of the encoder.

71. The modulation system of claim 70 wherein the modulator comprises a lowpass filter having a substantially flat response in the range of about f=0 to $f_{sym}/2$, wherein the lowpass filter has a stop band which begins at about $f_{sym}$ and wherein the lowpass filter is arranged to interpolate by four.

72. The modulation system of claim 71 wherein the lowpass filter is a first lowpass filter, and wherein the modulator comprises a second lowpass filter having a substantially flat response in the range of about f=0 to $f_{sym}/2$, wherein the second lowpass filter has a stop band which begins at about $3f_{sym}$, and wherein the second lowpass filter is arranged to interpolate by two.

73. The modulation system of claim 57 wherein the modulator comprises a lowpass filter having a substantially flat response in the range of about f=0 to $f_{sym}/2$, wherein the lowpass filter has a stop band which begins at about $f_{sym}$, wherein the lowpass filter is arranged to interpolate by four, and wherein $f_{sym}$ is a symbol clock of the encoder.

74. The modulation system of claim 73 wherein the lowpass filter is a first lowpass filter, and wherein the modulator comprises a second lowpass filter having a substantially flat response in the range of about f=0 to $f_{sym}/2$, wherein the second lowpass filter has a stop band which begins at about $3f_{sym}$, and wherein the second lowpass filter is arranged to interpolate by two.

75. The modulation system of claim 57 wherein the modulator comprises a lowpass filter having a substantially flat response in the range of about f=0 to $f_{sym}/2$, wherein the lowpass filter has a stop band which begins at about $3f_{sym}$, wherein the lowpass filter is arranged to interpolate by two, and wherein $f_{sym}$ is a symbol clock of the encoder.

76. The modulation system of claim 57 wherein the filter has a passband to pass selected images of the channel 3 and 4 frequencies.

77. A modulation system for modulating a television baseband signal to an RF signal or supply to an RF input of a digital television, the modulation system comprising:

an encoder that encodes a baseband digital signal in a standard channel coded format having a data clock rate $f_{sym}$;

an interpolator that interpolates the baseband digital signal by n; and, a mixer that mixes the interpolated baseband digital signal with an oscillator frequency in order to produce a frequency of a selected channel for low power communication to the digital television over a limited distance.

78. The modulation system of claim 77 wherein n is eight.

79. The modulation system of claim 78 wherein the oscillator frequency is about 25.77 MHZ to produce a channel 3 frequency signal.

80. The modulation system of claim 78 wherein the oscillator frequency is about 19.77 MHZ to produce a channel 4 frequency signal.

81. The modulation system of claim 78 wherein the oscillator frequency is about either 25.77 MHZ or 19.77 MHZ to produce a channel 3 or channel 4 frequency signal respectively.

82. The modulation system of claim 77 wherein the oscillator frequency is about $nf_{sym}$ minus a frequency of about 310 KHZ above the lower band edge of the selected television channel.

83. A remodulator for remodulating a television baseband signal to an RF signal for supply to an RF input of a digital television, the remodulator comprising:

an encoder that encodes a baseband digital signal in a standard channel coded format;

an interpolator that interpolates the baseband digital signal by eight; and, a mixer that mixes the interpolated baseband digital signal with an oscillator frequency in order to produce a frequency of a selected channel, wherein the oscillator frequency is a selected one of first and second oscillator frequencies, wherein the first oscillator frequency is about 25.77 MHZ to produce a channel 3 frequency signal, and wherein the second oscillator frequency is about 19.77 MHZ to produce a channel 4 frequency signal.

* * * * *